(12) United States Patent
Shutkin et al.

(10) Patent No.: US 8,868,890 B2
(45) Date of Patent: Oct. 21, 2014

(54) NO-DELAY MICROSEQUENCER

(75) Inventors: Yurii S. Shutkin, Moscow (RU); Elyar E. Gasanov, Moscow (RU); Ilya V. Neznanov, Moscow (RU); Andrey P. Sokolov, Moscow (RU); Pavel A. Panteleev, Moscow (RU)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 751 days.

(21) Appl. No.: 13/106,119

(22) Filed: May 12, 2011

(65) Prior Publication Data

US 2012/0117359 A1 May 10, 2012

(30) Foreign Application Priority Data

Nov. 10, 2010 (RU) .................................. 2010145507

(51) Int. Cl.
*G06F 9/30* (2006.01)
*G06F 9/32* (2006.01)
(52) U.S. Cl.
CPC ............ *G06F 9/322* (2013.01); *G06F 9/30054* (2013.01); *G06F 9/30065* (2013.01)
USPC ........................................................ 712/245
(58) Field of Classification Search
CPC ..................................... G06F 9/30; G06F 9/34
See application file for complete search history.

(56) References Cited

U.S. PATENT DOCUMENTS

| | | | | |
|---|---|---|---|---|
| 5,600,846 | A * | 2/1997 | Gallup et al. ...................... 712/5 |
| 5,832,258 | A * | 11/1998 | Kiuchi et al. .................. 712/226 |
| 6,134,648 | A * | 10/2000 | Peterson et al. ................ 712/41 |
| 6,438,680 | B1 * | 8/2002 | Yamada et al. ............... 712/210 |
| 6,961,084 | B1 * | 11/2005 | Duncan et al. ............. 348/222.1 |
| 6,968,448 | B2 * | 11/2005 | Snodgrass et al. ............ 712/241 |
| 6,976,158 | B2 * | 12/2005 | Catherwood et al. ......... 712/241 |
| 7,100,029 | B2 * | 8/2006 | Zou et al. ...................... 712/300 |
| 7,178,013 | B1 * | 2/2007 | Batcher ......................... 712/241 |
| 7,185,177 | B2 * | 2/2007 | Pechanek ...................... 712/205 |
| 7,596,681 | B2 * | 9/2009 | Wiese et al. .................. 712/227 |
| 7,937,574 | B2 * | 5/2011 | Clark et al. ................... 712/241 |

OTHER PUBLICATIONS

S. Kopec, et al., "Standalone Microsequencer", Microprocessors and Microsystems, Elsevier, Mar. 1998, 1 page.

\* cited by examiner

*Primary Examiner* — Eric Coleman
(74) *Attorney, Agent, or Firm* — Christopher P. Maiorana, PC

(57) ABSTRACT

An apparatus generally including a memory and a circuit is disclosed. The memory may be configured to store a plurality of instructions. Each of the instructions generally includes a corresponding command and a corresponding command repeat count. At least one of the instructions may include a subprocedure call. The circuit may be configured to (i) decode the instructions one at a time and (ii) present a sequence of the commands at an interface. The sequence (i) may be based on the decoding and (ii) may have no delays between consecutive the commands at the interface.

20 Claims, 7 Drawing Sheets

NO-DELAY MICROSEQUENCER

This application claims the benefit of Russian Application No. 2010145507, filed Nov. 10, 2010 and is hereby incorporated by reference in its entirety.

FIELD OF THE INVENTION

The present invention relates to microsequencers generally and, more particularly, to a method and/or apparatus for implementing a no-delay microsequencer.

BACKGROUND OF THE INVENTION

Interleaving of data is a feature of turbo codes commonly used in wireless communications standards. To perform the interleaving in hardware, interleaver tables are kept in memory or are generated on-the-fly. Storing all of the tables in the memory is often unsuitable because of size restrictions. A conventional interleaver computer interleaves the data according to the interleaver tables. The interleaver computer has a microsequencer that generates control signals to control execution of the interleaving operations.

The microsequencer should be optimized for an intended wireless communications standard. A conventional approach to optimize the microsequencer is to build a sequence program into the hardware of the microsequencer. In such a case, the microsequencer generates hardcoded commands, one by one, depending only on an input vector length. However, the hardcoding means that only a single standard is supported. A multi-standard interleaver thus incorporates multiple microsequencers, a different microsequencer for each wireless standard. Furthermore, a hardcoded microsequencer cannot be applied to a new wireless standard with a different interleaving sequence.

Another criterion for the microsequencer is a small delay between consecutively generated commands. For each interleave pattern, the sets of different commands are finite and relatively small. Thus, the command sets can be stored in a memory of the microsequencer. As such, the microsequencer fetches the commands from the memory in some particular order and directs the commands to other circuitry. The sequence of fetched commands can be nonlinear. The sequence can be described by a C-like program language, for example:

```
proc main {
    fetch command1 *5;
    fetch command2 *R1;
    call func1 *R0 ;
    fetch command5 *1;
}
proc func1 {
    fetch command1 *R0;
    fetch command4 *1;
    fetch command3 *R2;
}
```

Here "fetch <command>" means that the microsequencer fetches the <command> from the memory and "call" means a call of a subprocedure. Each call operation and fetch operation is executed X times as specified by the "*X". A value of X can be a value stored in a register at run time.

Existing subprocedure calls introduce a delay in fetching the next instruction from memory because the microsequencer uses time to process the resulting branch operation. Returning from subprocedures uses more time because the returns can be to different points in the program, depending on the real count of already executed instances of the subprocedures. As such, conventional implementations of the microsequencer have delays in all programs with subprocedure calls. Increasing the number of subprocedures results in increased delays.

SUMMARY OF THE INVENTION

The present invention concerns an apparatus generally including a memory and a circuit. The memory may be configured to store a plurality of instructions. Each of the instructions generally includes a corresponding command and a corresponding command repeat count. At least one of the instructions may include a subprocedure call. The circuit may be configured to (i) decode the instructions one at a time and (ii) present a sequence of the commands at an interface. The sequence (i) may be based on the decoding and (ii) may have no delays between consecutive commands at the interface.

The objects, features and advantages of the present invention include providing a method and/or apparatus for implementing a no-delay microsequencer that may (i) generate a sequence of commands without temporal delays between consecutive commands, (ii) be fully programmable, (iii) support subroutine calls in the programming and/or (iv) support interleaving for multiple wireless communications standards.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

A microsequencer is a device that generally fetches data from a program memory in some particular order. The sequence of fetched data may be defined statically or described with a C-like programming language. Usage of the microsequencer is generally described herein in terms of data interleaving designs and in particular, in terms of an interleaver computer. Other designs using a microsequencer may be implemented to meet the criteria of a particular application.

An interleaver computer is generally a programmable chip (or die or integrated circuit) configured to compute interleaver tables in accordance with one or more wired and/or wireless communications standards. The wireless communications standards may include, but are not limited to, a Long Term Evolution (LTE) standard (3GPP Release 8), an Institute of Electrical and Electronics Engineering (IEEE) 802.16 standard (WIMAX), a Wideband-CDMA/High Speed Packet Access (WCDMA/HSPA) standard (3GPP Release 7) and a CDMA-2000/Ultra Mobile Broadband (UMB) standard (3GPP2).

Figure 1:
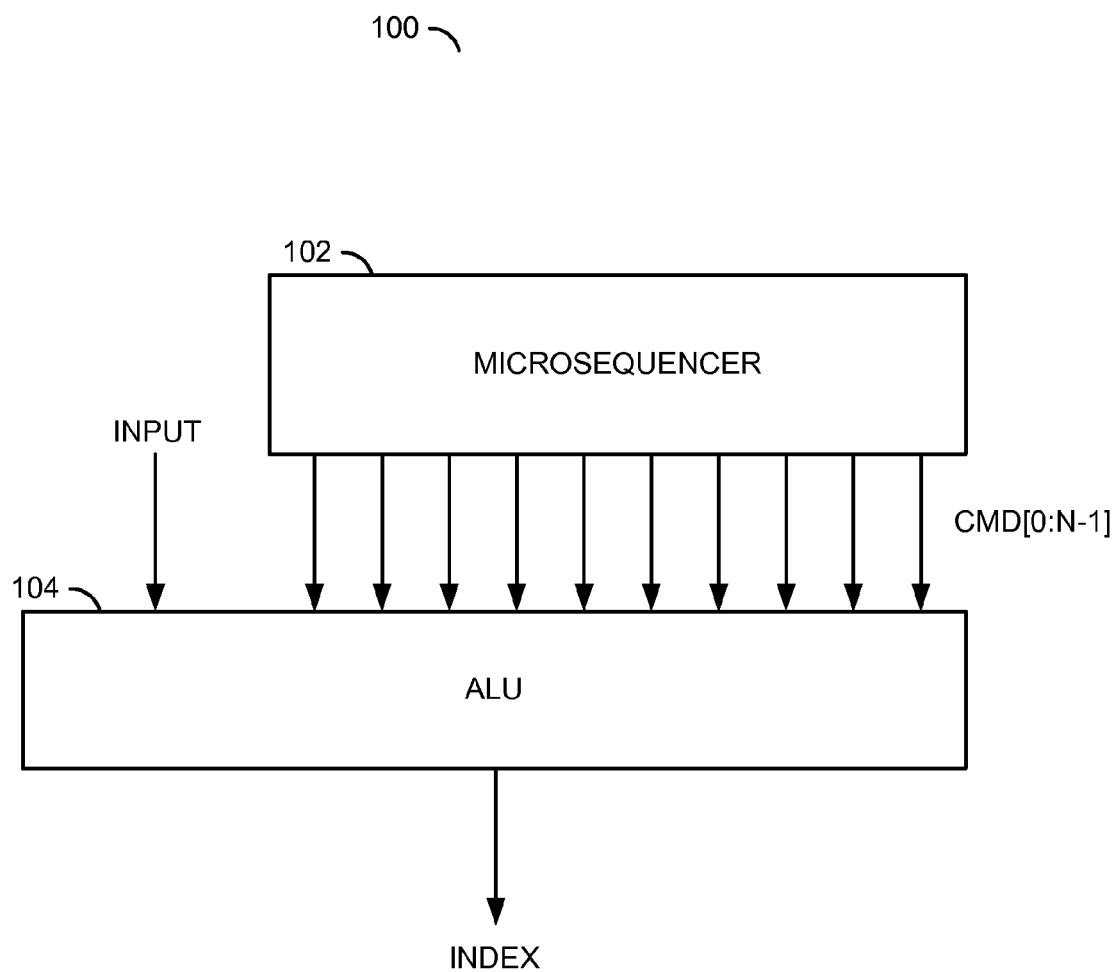
FIG. 1 is a block diagram of an example implementation of an apparatus.

Referring to FIG. 1, a block diagram of an example implementation of an apparatus 100 is shown. The apparatus (or device or circuit) 100 in the example may implement an interleaver computer. The apparatus 100 generally comprises a circuit (or module) 102 and a circuit (or module) 104. The circuits 102 to 104 may represent modules and/or blocks that may be implemented as hardware, firmware, software, a combination of hardware, firmware and/or software, or other implementations.

A signal (e.g., INPUT) may be received by the circuit 104. A multi-bit (e.g., N-bit) signal (e.g., CMD[0:N−1]) may be generated by the circuit 102 and transferred to the circuit 104. The circuit 104 may generate a signal (e.g., INDEX).

The circuit 102 generally implements a microsequencer circuit. The circuit 102 may be operational to generate a sequence of commands in the signal CMD based on a program (or software or firmware) loaded into the circuit 102. Programming of the circuit 102 may be performed using ordinary programming languages. The programming languages generally include, but are not limited to, the C language, the C++ language, C-like languages and other programming languages that support fetch operations and call operations. An ability to change the program generally allows the apparatus 100 to be configured for most existing communications standards and many possible future communications standards.

The program is generally compiled as multiple instructions. The instructions may be implemented as several types of fetch instructions. Each fetch instruction may include a corresponding command and a corresponding command repeat count. The commands may be used to set the various bits in the signal CMD. The repeat command counts generally indicate how many times in a row the commands should be inserted into the signal CMD.

Some fetch instructions may include one or more subprocedure calls. Each subprocedure call may include a corresponding call flag, a corresponding return address and a corresponding call repeat count. The call flags may be used to indicate the presence of a subprocedure call during decoding of the instruction. The return address generally identifies a next address that should be fetched upon completion of the subprocedure. The call repeat count may indicate how many times in a row the subprocedure should be executed.

Some fetch instructions may include a return flag. The return flag commonly indicates the end of an earlier subprocedure call. A return flag not paired to any subprocedure call may also be used in the last fetch instruction to indicate the end of a main procedure in the program.

The circuit 102 may generate the signal CMD by decoding the instructions one at a time and presenting the decoded sequence of commands in the signal CMD. Update timing for the commands in the signal CMD may be once per clock cycle. Where a command is repeated M times, the command may be present in the signal CMD for M consecutive clock cycles. The resulting sequence of commands in the signal CMD may have minimal or no temporal delays between consecutive commands. In some applications, an exception may exist to the non-delay performance where a command repeat count is defined at run time (via a register) to a zero value.

The circuit 104 may implement an Arithmetic Logic Unit (ALU) circuit. The circuit 104 may be optimized to perform basic arithmetic operations. In some embodiments, the circuit 104 may generate one or more interleaver tables based on the commands received in the signal CMD and the data received in the signal INPUT. The interleaver tables may be presented the signal INDEX. In various embodiments, the circuit 104 may generate up to two indices of the interleaver tables in each clock cycle. The indices may be used immediately to perform data permutations.

Any program for the circuit 102 may have a C-like style and may contain a number of procedures (e.g., marked with "proc" keyword). Each procedure body generally includes a sequence of fetch instructions and some call instructions. A fetch instruction generally commands the circuit 102 to fetch a specified command from memory and present the command to the circuit 104 in the signal CMD. A call instruction generally means a call of a subprocedure. Each instruction may be followed by a command repeat count. The command repeat count is generally defined with either an immediate value (e.g., 5) or a register identifier (e.g., R2). Command repeat count values stored in registers may be defined at run time. The command repeat count may inform the circuit 102 how many times in a row the corresponding instruction should be repeated. An example program (e.g., program A) may be illustrated as follows:

```
proc main {
    fetch command1 *5;
    call func1 *2;
    fetch command5 *1;
}
proc func1 {
    fetch command4 *1;
    fetch command3 *R2;
}
```

A circuit 102 loaded with the above program may produce the following sequence of commands in the signal CMD:

```
command1
command1
command1
command1
command1
command4
command3
...
command3 // R2 times (becomes known at run time)
command4
command3
...
command3 // R2 times (becomes known at run time)
command5
```

Consider a case where the example program is loaded into a program memory of the circuit 102 and executed like a general assembler. At each clock, an instruction may be fetched from the program memory and buffered in an output register. If the output register contains a fetch instruction, the circuit 104 may be configured with the commands in the fetch instruction. Further fetching may be stalled until the command repeat count is done. Once the stall has ended, a next instruction may be fetched from the program memory.

If the output register contains a call instruction, a return address of the call may be put on a stack. The call address may be decoded and sent to the program memory. On the next clock, the correct instruction may be fetched from the program memory. After two clocks, the correct instruction may be decoded and available in the signal CMD. Therefore, a two clock cycle delay may be created for every call instruction.

To overcome the two cycle delays, another type of compilation of the program may be used. In the other compilation, each instruction loaded to the program memory may be a fetch instruction with some call parameters and/or return parameters. The compilation may process the instructions as described below.

A main procedure may be established by the compiler. Process instructions in the main procedure may be added one by one. If the process instruction is a fetch instruction, the fetch instruction may be written to the program memory. If the process instruction is a call instruction, the processing may store the call instruction in a stack. Processing may then recursively enter into the specified procedure (or subprocedure or function) until an initial fetch instruction is found. The found initial fetch instruction may be added to the program memory with a call flag and parameters. Processing generally continues with the instruction next to the found initial fetch instruction. A last fetch instruction in the specified procedure may be added to the program memory with a return flag. Thereafter, the call instruction may be popped from the stack. The next instruction may reside after the popped call instruction. Processing generally finishes at a last instruction in the main procedure. The last instruction may also be marked with a return flag to signal the end of the main procedure.

A tree presentation of a program may be used to describe the compilation processing. Each instruction may be a node of the tree. A leading edge going from each tree node generally connects the tree mode with the instruction next to the current instruction inside the body of the called procedure. Each call node may also have another edge pointing to an initial instruction in called procedure. Another example program (e.g., program B) may be illustrated as follows:

```
proc main {
    fetch command1 *5;
    call func1 *R0;
    fetch command6 *4;
}
proc func1 {
    call F *1;
    call B *R2;
}
proc F {
    fetch command2 *3;
    fetch command3 *R3;
}
proc B {
    fetch command4 *2;
    fetch command5 *1;
}
```

Figure 2:
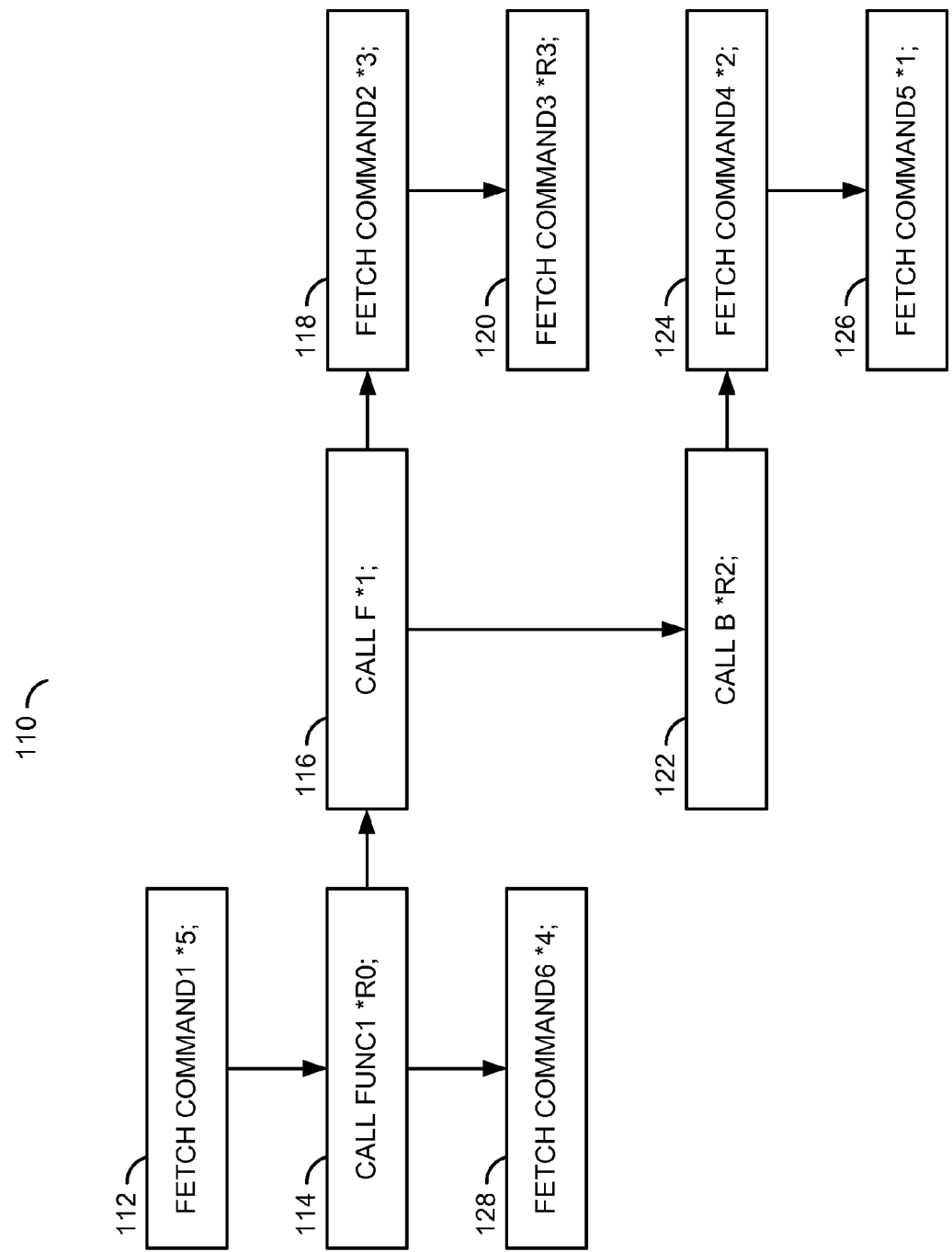
FIG. 2 is a block diagram of a tree representation of a program.

Referring to FIG. 2, a block diagram of a tree representation 110 of program B is shown. The tree 110 generally comprises a node (or branch) 112, a node (or branch) 114, a node (or branch) 116, a node (or branch) 118, a node (or branch) 120, a node (or branch) 122, a node (or branch) 124, a node (or branch) 126 and a node (or branch) 128.

Node 112 may represent the initial fetch command in the procedure main. Node 114 may represent the call instruction to procedure func1. Within procedure func1, the call instruction to procedure F is generally presented by node 116. Node 118 may represent the initial fetch instruction in procedure F. Node 120 generally presents the final fetch instruction in procedure F. The call instruction to procedure B may be represented by node 122. Node 124 may represent the initial fetch instruction in procedure B. Node 126 may represent the last fetch instruction in procedure B. The final fetch instruction in procedure main is generally represented by node 128.

With the program represented as the tree 110, a compiler may write instructions to the program memory as follows. Starting with the initial node 112, the compiler may operate line by line through the tree 110. Where a node 112 to 128 represents a fetch instruction (e.g., node 112), the compiler may write the instruction to the program memory. Where the node represents a call instruction (e.g., nodes 114, 116 and 122), the compiler generally writes the rightmost fetch instruction (e.g., always a unique fetch instruction in the line) with all call parameters if any call nodes exist to the left of the rightmost fetch instruction. If a node representing a fetch instruction has no arrow going down (e.g., nodes 120, 126 and 128), a return flag may be set in the respective fetch instruction.

A result of compiling program B may be as follows:
Instruction0=fetch command1*5
Instruction1=fetch command2*3 call0 retaddr5*R0 call) retaddr3*1
Instruction2=fetch command3*R3 ret
Instruction3=fetch command4*2 call1 retaddr0*R2
Instruction4=fetch command5*1 ret
Instruction5=fetch command6*4 ret Compilation generally takes into account the level from which of each call is made. For example calls from procedure func1. (at level 0) may have a level 1 designation. The call to procedure B has a zero return address (e.g., retaddr0). The zero return address generally means that procedure func1. should be popped from the stack along with the procedure B when execution of procedure B is finished.

Each instruction may be encoded and loaded to the program memory of the circuit 102. General instruction encoding may be as follows:
<command id><command repeat count><ret flag>stack_depth*(<call_flag><return address><call repeat count>) The parameter stack_depth generally indicates a maximum depth of a stack in the circuit 102.

Figure 3:
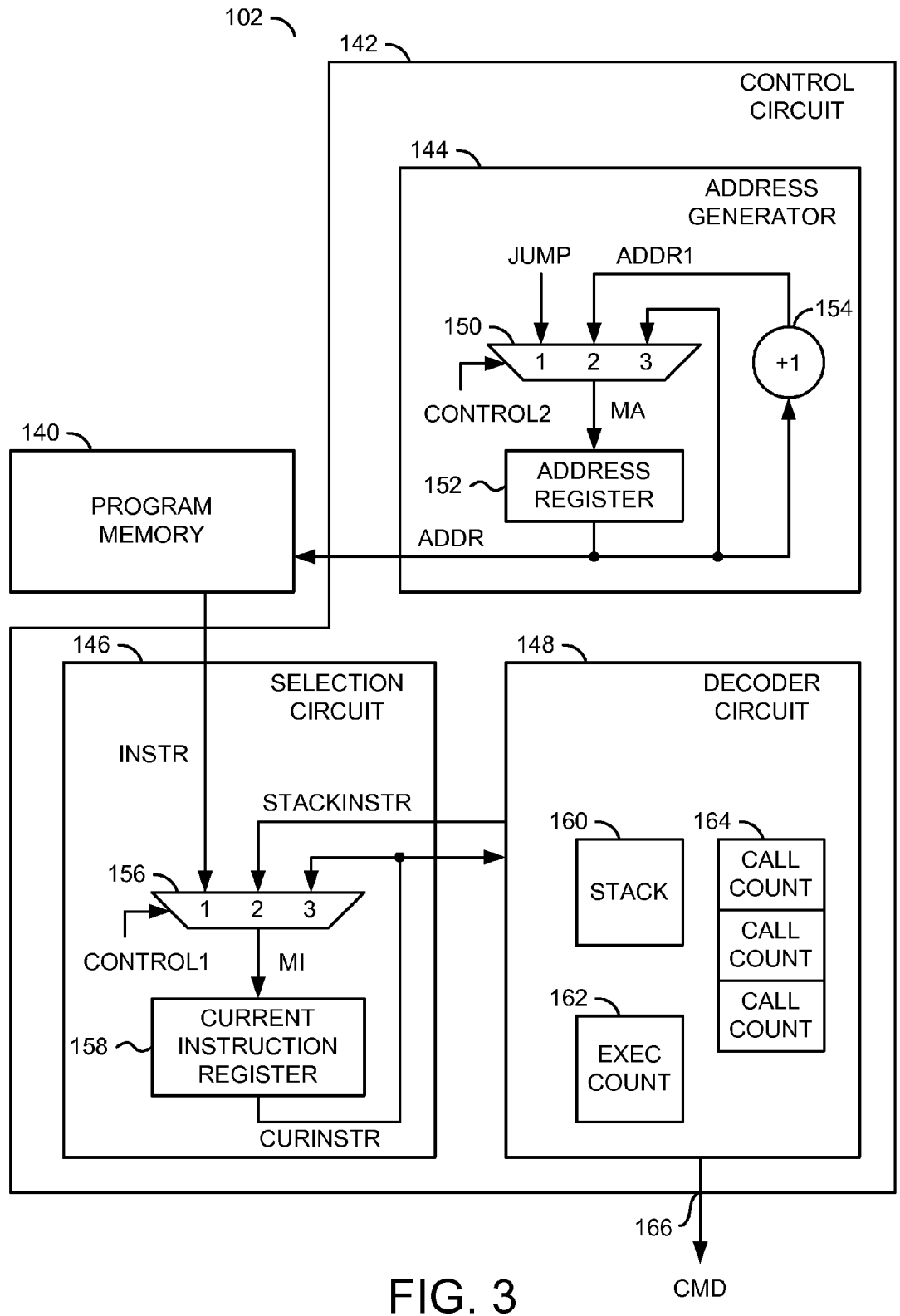
FIG. 3 is a block diagram of a microsequencer in accordance with a preferred embodiment of the present invention.

Referring to FIG. 3, a block diagram of the circuit 102 is shown in accordance with a preferred embodiment of the present invention. The circuit 102 generally comprises a circuit (or module) 140 and a circuit (or module) 142. The circuit 142 may comprise a circuit (or module) 144, a circuit (or module) 146 and a circuit (or module) 148. The circuit 144 generally comprises a circuit (or module) 150, a circuit (or module) 152 and a circuit (or module) 154. The circuit 146 may comprise a circuit (or module) 156 and a circuit (or module) 158. The circuit 148 may comprise a circuit (or module) 160, a circuit (or module) 162 and a circuit (or module) 164. The circuits 140 to 164 may represent modules and/or blocks that may be implemented as hardware, firmware, software, a combination of hardware, firmware and/or software, or other implementations.

A signal (e.g., INSTR) may be generated by the circuit 140 and transferred to the circuit 156. The circuit 156 may generate a signal (e.g., MI) received by the circuit 158. A signal (e.g., CURINSTR) may be generated by the circuit 158 and received by the circuit 148 and the circuit 156. A signal (e.g., STACKINSTR) may be generated by the circuit 148 and transferred to the circuit 156. The circuit 148 may generate a signal (e.g., CONTROL1) received by the circuit 156. A signal (e.g., CONTROL2) may also be generated by the circuit 148 and received by the circuit 150. The circuit 148 may generate and transfer a signal (e.g., JUMP) to the circuit 150. A signal (e.g., MA) may be generated by the circuit 150 and transferred to the circuit 152. A signal (e.g., ADDR) may be generated by the circuit 152 and transferred to the circuits 140, 150 and 154. The circuit 154 may generate a signal (e.g., ADDR1) received by the circuit 150. The signal CMD may be generated by the circuit 148 and presented at an output interface 166 of the circuit 102.

The circuit 140 may be implemented as a program memory circuit. The circuit 140 is generally operational to store one or more programs used by the circuit 142 to generate a sequence of commands in the signal CMD. In some embodiments, the circuit 140 may be programmable. In other embodiments, the circuit 140 may be one-time programmable. In some embodiments, the circuit 140 may be nonvolatile.

The circuit 142 may implement a control circuit. The circuit 142 is generally operational to fetch instructions from the circuit 140, decode the instructions, present commands in the signal CMD and determine which instruction should be fetched next from either the circuit 140 or the stack 160.

The circuit 144 generally implements an address generator circuit. The circuit 144 may be operational to generate multiple possible next addresses. A selected address among the possible next addresses may be presented to the circuit 140 in the signal ADDR. Selection of the next address may be provided by the signal CONTROL2.

The circuit 146 generally implements a selection circuit. The circuit 146 may be operational to select a current instruction from among multiple sources. The sources may include the circuit 140, the stack 160 and the circuit 158. Selection of the current instruction may be provided by the signal CONTROL1.

The circuit 148 may implement a decoder circuit. The circuit 148 is generally operational to (i) decode the current instruction buffered in the circuit 158 to generate a command in the signal CMD and (ii) control the circuits 144 and 146 using the signals CONTROL1 and CONTROL2. The circuit 148 may include the stack 160, an execution counter 162 and stack level (e.g., multiple) call counters 164. A counter 164 may exist for each level of the stack 160.

The circuit 150 may implement a multiplexer circuit. The circuit 150 generally routes the signals JUMP, ADDR and ADDR1 to the signal MA. Routing may be controlled by the signal CONTROL2.

The circuit 152 may implement a buffer circuit. The circuit 152 may buffer an address value received in the signal MA. The buffered address value may be presented in the signal ADDR.

The circuit 154 may implement an incrementor circuit. The circuit 154 may increment the address value received in the signal ADDR. An incremented address value may be presented in the signal ADDR1.

The circuit 156 may implement a multiplexer circuit. The circuit 156 generally routes the signals INSTR, STACKINSTR and CURINSTR to the signal MI. Routing may be controlled by the signal CONTROL1.

The circuit 158 may implement a buffer circuit. The circuit 158 may buffer an instruction conveyed in the signal MI. The buffered instruction may be presented in the signal CURINSTR.

Instruction may be fetched from the circuit 140 as follows. At an initial clock, the address of the instruction may be sent from the circuit 144 to the circuit 140 via the signal ADDR. At a next clock, the circuit 140 generally responds by presenting the addressed instruction in the signal INSTR. The instruction may be buffered in the circuit 158. At a subsequent clock, the instruction buffered in the circuit 158 may be decoded by the circuit 148 and the command may be sent by the circuit 148 to the circuit 104.

By default, the address value sent in the signal ADDR to the circuit 140 may be incremented each clock by the circuit 154 until the incrementing is stalled or a different address is specified directly by internal mechanisms. Therefore, when the circuit 158 contains an instruction previously read from address X of the circuit 140, the circuit 140 may present another instruction in the signal INSTR from address X+1. As such, the instruction may be ready for the circuit 158 on the next clock without decoding the current instruction buffered in the circuit 158.

Figure 4:
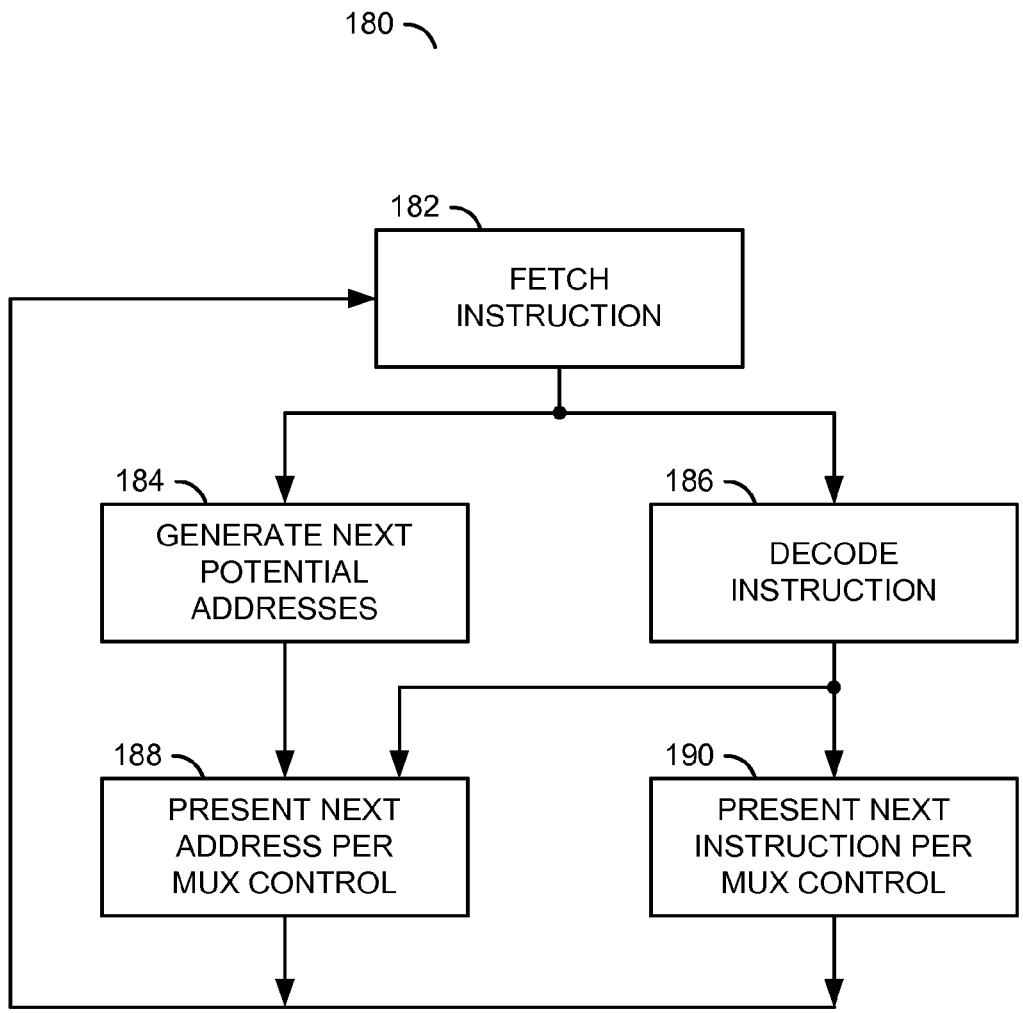
FIG. 4 is a flow diagram of an example method for generating a sequence of commands.

Referring to FIG. 4, a flow diagram of an example method 180 for generating a sequence of commands is shown. The method (or process) may be implemented by the circuit 102. The method 180 generally comprises a step (or block) 182, a step (or block) 184, a step (or block) 186, a step (or block) 188 and a step (or block) 190. The steps 182 to 190 may represent modules and/or blocks that may be implemented as hardware, firmware, software, a combination of hardware, firmware and/or software, or other implementations.

In the step 182, the circuit 146 may fetch an instruction from either the circuit 140 or the stack 160. The circuit 144 may generate multiple potential new addresses (e.g., a jump address, the current address and an incremented address) in the step 184. The fetched instruction may be decoded by the circuit 148 in the step 186. Steps 184 and 186 may be carried out in parallel. The decoding of step 186 may set the multiplex control signals (e.g., CONTROL1 and CONTROL2). Therefore, the circuit 144 may present the next address selected by the signal CONTROL2 to the circuit 140 in the step 188. Likewise, the circuit 146 may present the next instruction selected by the signal CONTROL1 to the circuit 148 in the step 190 where the instruction is decoded.

The circuit 148 may include the counter circuits 162 and 164 to control the sequencing. The circuit 162 may implement an execution counter. The circuit 162 may be operational to count repeated commands in the signal CMD. The execution counter may initialize to a value of <command repeat counter>−1 when a new instruction is loaded from the circuit 140 or is received from the stack 160. The execution counter may be decremented on each clock, matching the repeat of the command in the signal CMD. While the execution counter is greater than zero, the signals CONTROL1 and CONTROL2 are both set to 3 such that the address and the current instruction are not changed.

When the execution counter reaches a zero value, the next address is sent from the circuit 144 to the circuit 140 to fetch the next instruction. The signal CONTROL2 may convey a value of 2 and the signal CONTROL1 may convey a value of 1 such that the circuit 158 stores the next instruction received from the circuit 140. The above description may be considered default behavior when the current instruction does not have a return flag. Behavior where the return flag is set is generally described later.

The circuit 164 may include a call counter for each call level available in the stack 160. Each call counter may be operational to count corresponding call repeats. A call counter may be initialized with <call repeat counter>−1 when an instruction is fetched from the circuit 140 or is received from the stack 160 and the corresponding call flag is set to 1 in the instruction. Decrementing of a call counter is generally performed when a return flag is reached. When a return flag is reached, the signal CONTROL1 may be set to a value of 2 and the signal CONTROL2 may be set to a value of 1. Signal. CONTROL1 may route the initial instruction of the called procedure from the stack 160 to the circuit 158 via the signal STACKINSTR. Signal CONTROL2 may route the address of the next instruction in the called procedure from the stack 160 to the circuit 152 via the signal JUMP. When the call counter reaches the zero value, the top instruction may be popped from the stack 160 and execution continues from the return address. By default, the instruction at the return address is compiled, to be next to the instruction with the return flag. As such, the return address instruction may be fetched from the circuit 140 and buffered in the circuit 158 at the next clock.

Figure 5:
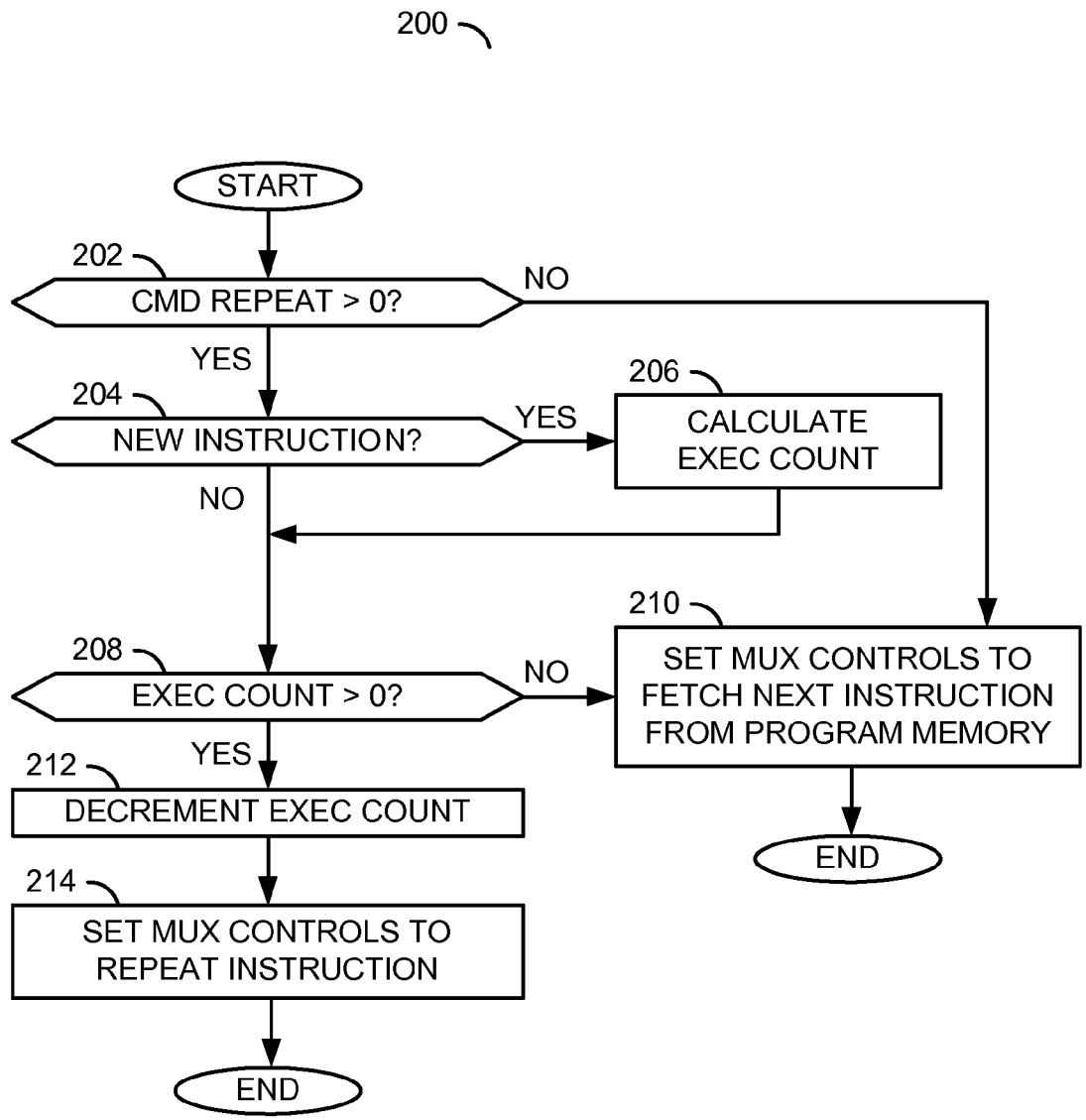
FIG. 5 is a flow diagram of an example method for decoding a fetch instruction.

Referring to FIG. 5, a flow diagram of an example method 200 for decoding a fetch instruction is shown. The method (or process) 200 may be implemented by the circuit 148. The method 200 generally comprises a step (or block) 202, a step (or block) 204, a step (or block) 206, a step (or block) 208, a step (or block) 210, a step (or block) 212 and a step (or block) 214. The steps 202 to 214 may represent modules and/or blocks that may be implemented as hardware, firmware, software, a combination of hardware, firmware and/or software, or other implementations.

In the step 202, an instruction may be analyzed to determine if the corresponding command repeat count has a value of zero or not. If not, a check is made to determine if the instruction is new or a repeat of the current instruction. If the instruction is new (e.g., the YES branch of step 204), an initial value of the execution count is calculated in the step 206.

If the instruction is a repeat (e.g., the NO branch of step 204) or after the initial execution count is calculated, the current execution count may be examined. If the current execution count is not greater than zero (e.g., the NO branch of step 208), the circuit 148 may set the multiplexer controls in the step 210 to fetch the next instruction from the circuit 140. Thereafter, decoding of the current fetch instruction may end.

In the execution count is greater than zero (e.g., the YES branch of step 208), the execution count may be decremented in the step 212. In the step 214, the multiplexer controls may be set to repeat the current fetch instruction. Decoding of the current fetch instruction may then end.

The stack 160 in the decoder 148 may be used to track all subprocedure calls. Each time when an instruction with a call flag is decoded, the instruction is put on the stack 160. For example, Instruction1 of compiled program B may be put to both stack[0] and stack[1] because Instruction1 has both a 0-level call flag and a 1-level call flag. Once Instruction2 has finished, the copy of Instruction1 at stack[1] may be popped due to the return flag in Instruction2. Decoding the subprocedure call in Instruction3 generally causes Instruction3 to be put at stack[1] once because Instruction3 has a single 1-level call flag. Once Instruction4 has finished, Instruction3 may be popped from stack[1] and instructionl may be popped from stack[0]. The return flag in Instruction6 may signal the end of the program.

Figure 6:
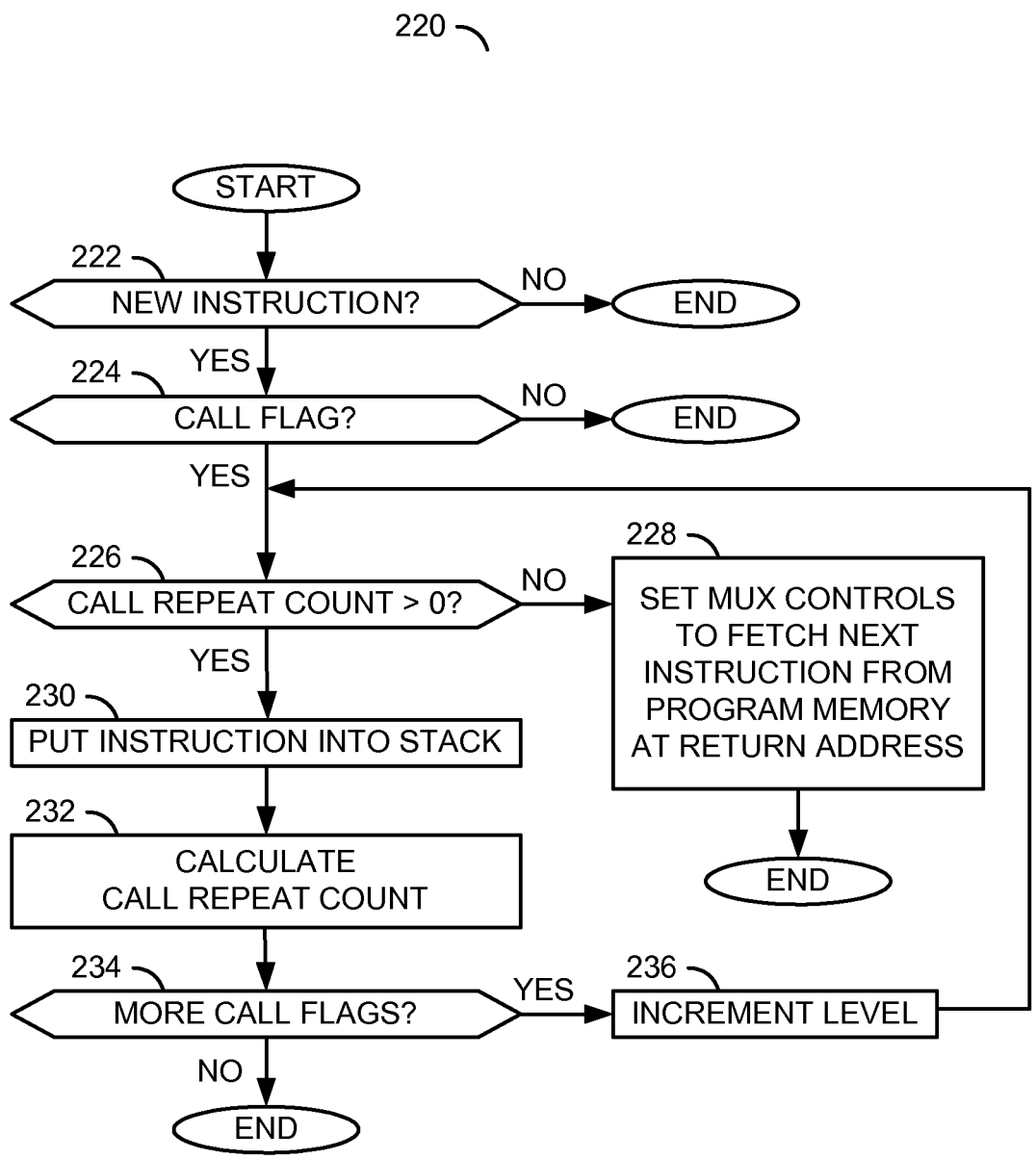
FIG. 6 is a flow diagram of an example method for decoding subprocedure calls.

Referring to FIG. 6, a flow diagram of an example method 220 for decoding subprocedure calls is shown. The method (or process) 220 may be implemented by the circuit 148. The method 220 generally comprises a step (or block) 222, a step (or block) 224, a step (or block) 226, a step (or block) 228, a step (or block) 230, a step (or block) 232, a step (or block) 234 and a step (or block) 236. The steps 222 to 236 may represent modules and/or blocks that may be implemented as hardware, firmware, software, a combination of hardware, firmware and/or software, or other implementations.

In the step 222, the instruction may be analyzed and determined to be either a repeat of the previous instruction (e.g., the NO branch) or a new instruction (e.g., the YES branch). If the instruction is a repeat, decoding of the call may end. If the instruction is new, a search of the instruction may be conducted in step 224 looking for call parameters. If no call parameters are found (e.g., the NO branch of step 224), the call decoding may end. If a call parameter is found (e.g., the YES branch of step 224), the call counter of the just-found call level may be checked.

If the call counter of the level is not greater than zero (e.g., the NO branch of step 226), the multiplexer control signals may be set in the step 228 to fetch a next instruction from the circuit 140 at the return address. If the call counter of the level is greater than zero (e.g., the YES branch of step 226), the instruction may be pushed onto the stack 160 at the level in the step 230. In the step 232, an initial call count for the level may be calculated. A check for more calls in the instruction may be performed in the step 234. If more calls are found (e.g., the YES branch of step 234), the current level may be incremented in the step 236. Thereafter, the method 220 may return to the step 226 to check the call counter of the call at the incremented level. If no more calls are found (e.g., the NO branch of step 234), decoding of the calls may be ended.

Figure 7:
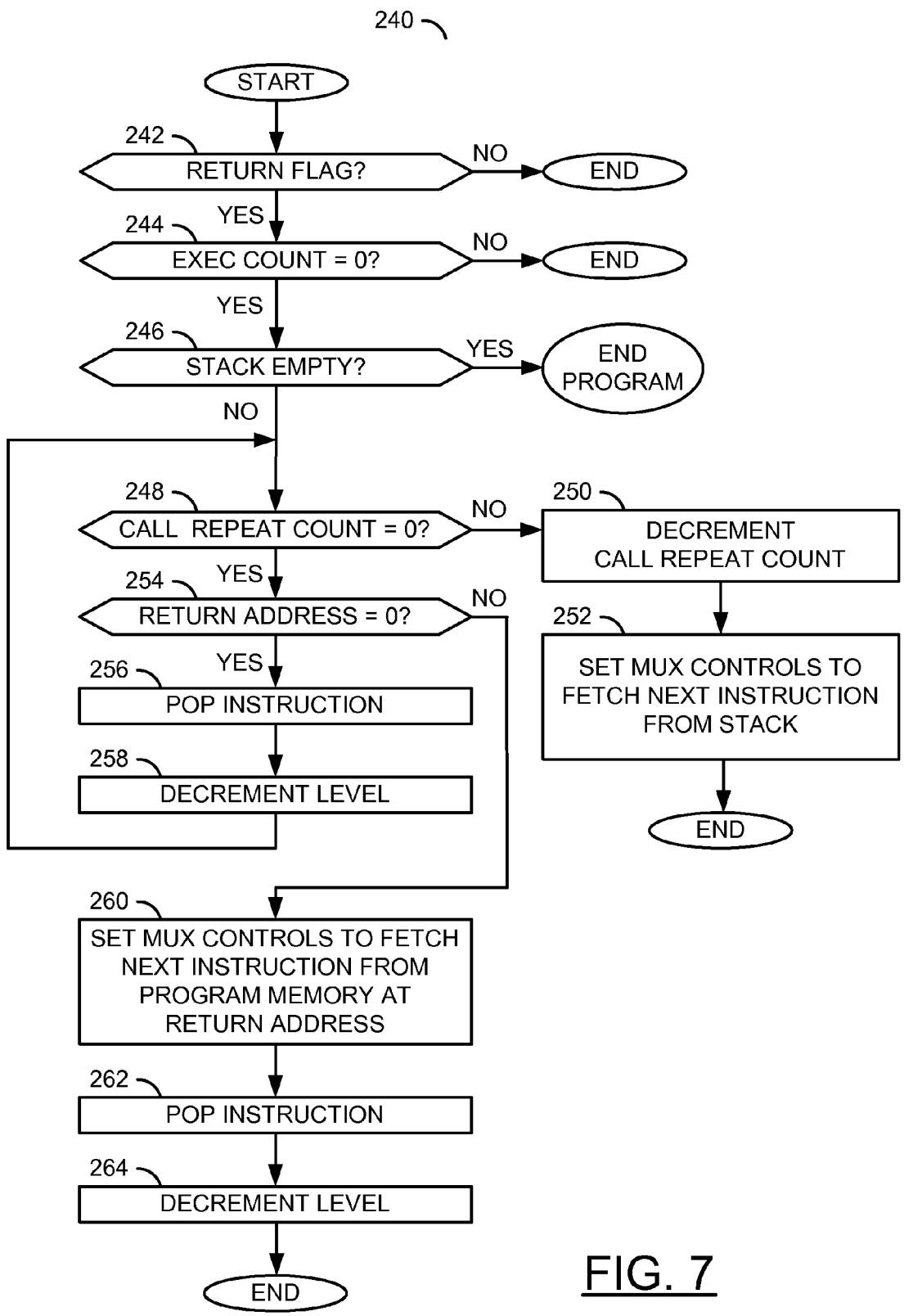
FIG. 7 is a flow diagram of an example method for decoding returns.

Referring to FIG. 7, a flow diagram of an example method 240 for decoding returns is shown. The method (or process) 240 may be implemented by the circuit 148. The method 240 generally comprises a step (or block) 242, a step (or block) 244, a step (or block) 246, a step (or block) 248, a step (or block) 250, a step (or block) 252, a step (or block) 254, a step (or block) 256, a step (or block) 258, a step (or block) 260, a step (or block) 262 and a step (or block) 264. The steps 242 to 264 may represent modules and/or blocks that may be implemented as hardware, firmware, software, a combination of hardware, firmware and/or software, or other implementations.

In the step 242, an instruction may be analyzed to determine if a return flag is present or not. If not (e.g., the NO branch), the decoding of the return may end. If a return flag is present (e.g., the YES branch), the execution count of the instruction may be checked. If the execution count is not zero (e.g., the NO branch of step 244), the instruction is still in use and the decoding may be ended. If the execution count is zero (e.g., the YES branch of step 244), the stack 160 may be checked.

If the stack is empty (e.g., the YES branch of step 246), the instruction is the last instruction in the program and decoding may be ended. If the stack is not empty (e.g., the NO branch of step 246), the call count of the current level is checked. If the call count is not zero (e.g., the NO branch of step 248), the call count at the current level may be decremented in step 250. In the step 252, the multiplexer controls may be set to fetch the next instruction from the stack 160 at the decremented level.

If the call count of the current level is zero (e.g., the YES branch of step 248), the return address may be analyzed. If the return address is zero (e.g., the YES branch of step 254), the instruction may be popped from the stack 160 in the step 256. In the step 258, the current level may be decremented. The method 240 may continue with the step 248 to check the call count of the decremented level.

If the return address of the instruction is not the zero address (e.g., the NO branch of step 254), the multiplexer controls may be set in the step 260 to fetch the next instruction from the return address in the circuit 140. In the step 262, the instruction may be popped from the stack 160 since the call has completed. In the step 264, the current level may be decremented. Decoding of the return may thus be ended.

Returning to FIG. 6, cases may occur where the command repeat count value may be set to zero at run time (e.g., the NO branch of step 226). If the instruction does not have a call flag, the multiplexer control may be set in the step 228 such that execution switches to the next instruction (which should be already fetched from the circuit 140). If the instruction has a call flag and the call repeat count is zero, the whole procedure body may be skipped and execution should continue with the return address. The return address may be decoded only when the call instruction comes to the circuit 148. Therefore, the instruction at the return address may be fetched and decoded two clocks afterwards.

The no-delay microsequencer (e.g., circuit 102) may be used in any design where sequencing of stored instructions is appropriate. Furthermore, an area of the chip in (on) which the circuit 102 is fabricated may be relatively small. Generally the area depends on the size of the program memory. The size of the compiled program may be not more than a quadratic from the pre-compiled program size. Quadratic behavior generally appears because each instance of a procedure is written to the program memory separately. Writing multiple instances is generally done to get the effect that a return addresses of the procedures may be located in the program memory right after the return instructions. If small delays are not a concern, the programming may permit small delays in execution on procedure returns. Therefore, the compiled program size may have a linear dependance on the pre-compiled program size.

The apparatus 100 may be flexible in terms of parameters. Therefore, a maximum stack depth (e.g., 2), a maximum number of different commands (e.g., data memory size), a command width, a maximum repeat count and the like may be readily specified.

The microsequencer described above may be fully programmable. Programmability of the circuit 102 coupled with a set of basic arithmetic operations in the circuit 104 suitable for existing communications standards generally provides a path to handle future communications standards. Users of an interleaver computer based on the microsequencer may load existing programs or newly created programs to implement the data interleaving per existing and new communications standards.

The microsequencer generally produces the command sequence without delays between adjoining commands. In comparison with previous microsequencer versions that use common branch processing mechanisms, delays experienced in complex programs with many procedure calls may be decreased or completely eliminated.

The functions performed by the diagrams of FIGS. 4-7 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radiofrequency integrated circuits), ASSPs (application specific standard products), monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

As would be apparent to those skilled in the relevant art(s), the signals illustrated in FIGS. 1 and 3 represent logical data flows. The logical data flows are generally representative of physical data transferred between the respective blocks by, for example, address, data, and control signals and/or busses. The system represented by the apparatus 100 may be implemented in hardware, software or a combination of hardware and software according to the teachings of the present disclosure, as would be apparent to those skilled in the relevant art(s).

While the invention has been particularly shown and described with reference to the preferred embodiments thereof, it will be understood by those skilled in the art that various changes in form and details may be made without departing from the scope of the invention.

The invention claimed is:

1. An apparatus comprising:
a memory configured to store a plurality of instructions, wherein (i) each of said instructions includes a corresponding command and a corresponding command repeat count and (ii) at least one of said instructions includes a subprocedure call; and
a circuit configured to (i) decode said instructions one at a time to extract said commands and said command repeat counts and (ii) present a sequence of said commands at an interface to a logic circuit, wherein said sequence (i) is based on said command repeat counts and (ii) has no delays between consecutive said commands at said interface, and said circuit is implemented in hardware or a combination of hardware and software.

2. The apparatus according to claim 1, wherein (i) said memory and said circuit form a microsequencer and (ii) said commands control generation of one or more interleaver tables by said logic circuit.

3. The apparatus according to claim 1, wherein said decoding occurs in parallel with an identification of a next of said instructions to contribute to said sequence of said commands.

4. The apparatus according to claim 1, wherein said circuit is further configured to generate in parallel a plurality of possible address values to present to said memory.

5. The apparatus according to claim 4, wherein (i) said circuit is further configured to generate a control signal based on said decoding and (ii) said control signal determines which one among said possible address values generated in parallel are presented to said memory.

6. The apparatus according to claim 1, wherein said circuit is further configured to select a next of said instructions to add to said sequence of said commands from a plurality of sources.

7. The apparatus according to claim 6, wherein (i) said circuit is further configured to generate a control signal based on said decoding and (ii) said control signal determines which among said sources provides said next instruction.

8. The apparatus according to claim 1, wherein said circuit is further configured to buffer in a stack up to a plurality of said instructions that include said subprocedure call.

9. The apparatus according to claim 1, wherein (i) each of said instructions having said subprocedure call further include a corresponding call repeat count and a corresponding return address and (ii) at least one of said instructions further includes a return flag.

10. The apparatus according to claim 1, wherein said apparatus is implemented as an integrated circuit.

11. A method for no-delay microsequencing, comprising the steps of:
(A) storing a plurality of instructions in a memory, wherein (i) each of said instructions includes a corresponding command and a corresponding command repeat count and (ii) at least one of said instructions includes a subprocedure call;
(B) decoding said instructions one at a time to extract said commands and said command repeat counts; and
(C) presenting a sequence of said commands at an interface to a logic circuit, wherein said sequence (i) is based on said command repeat counts and (ii) has no delays between consecutive said commands at said interface.

12. The method according to claim 11, wherein (i) said steps operate as a microsequencer and (ii) said commands control generation of one or more interleaver tables by said logic circuit.

13. The method according to claim 11, wherein said decoding occurs in parallel with an identifying of a next of said instructions to contribute to said sequence of said commands.

14. The method according to claim 11, further comprising the step:
generating in parallel a plurality of possible address values to present to said memory.

15. The method according to claim 14, further comprising the step of:
generating a control signal based on said decoding, wherein said control signal determines which one among said possible address values generated in parallel are presented to said memory.

16. The method according to claim 11, further comprising the step of:
selecting a next of said instructions to add to said sequence of said commands from a plurality of sources.

17. The method according to claim 16, further comprising the step of:
generating a control signal based on said decoding, wherein said control signal determines which among said sources provides said next instruction.

18. The method according to claim 11, further comprising the step of:
buffering in a stack up to a plurality of said instructions that include said subprocedure call.

19. The method according to claim 11, wherein (i) each of said instructions having said subprocedure call further include a corresponding call repeat count and a corresponding return address and (ii) at least one of said instructions further includes a return flag.

20. An apparatus comprising:
means for storing a plurality of instructions, wherein (i) each of said instructions includes a corresponding command and a corresponding command repeat count and (ii) at least one of said instructions includes a subprocedure call; and
means for controlling configured to (i) decode said instructions one at a time to extract said commands and said command repeat counts and (ii) present a sequence of said commands at an interface to a logic circuit, wherein said sequence (i) is based on said command repeat counts and (ii) has no delays between consecutive said commands at said interface, and said controlling means is implemented in hardware or a combination of hardware and software.

* * * * *